July 14, 1953

R. W. MAY ET AL 2,645,321

AUTOMATIC TUNING CONTROL FOR RADIO
APPARATUS AND THE LIKE

Filed July 15, 1948

INVENTOR.
RICHARD W. MAY
BY ROSS S. PYLE

John J. Rogan
ATTORNEY

INVENTOR.
RICHARD W. MAY
BY ROSS S. PYLE
ATTORNEY

R. W. MAY ET AL 2,645,321

AUTOMATIC TUNING CONTROL FOR RADIO APPARATUS AND THE LIKE

Filed July 15, 1948

INVENTOR.
RICHARD W. MAY
ROSS S. PYLE

BY

ATTORNEY

Patented July 14, 1953

2,645,321

UNITED STATES PATENT OFFICE 2,645,321

AUTOMATIC TUNING CONTROL FOR RADIO APPARATUS AND THE LIKE

Richard W. May and Ross S. Pyle, Cedar Rapids Iowa, assignors to Collins Radio Company, Cedar Rapids, Iowa, a corporation of Iowa Application July 15, 1948, Serial No. 38,934

32 Claims. (Cl. 192—142)

This invention relates to automatic control arrangements for radio apparatus and the like, and more particularly to improved automatic shaft positioning mechanisms for such apparatus.

A principal object of the invention relates to an automatic shaft positioning arrangement for radio apparatus and the like, employing coarse and fine selection controls whereby the shaft can be selectively moved through any one of a large number of complete turns and can be selectively stopped at any one of a desired number of incremental stopping positions in the selected turns.

Another object is to provide an improved automatic selecting control arrangement for so-called multi-turn devices. Examples of such devices are the usual slug tuners such as used in radio sets, or lead screw arrangements which control the setting of circuit elements such as condensers, inductances and the like.

Another object is to provide an improved device for selectively rotating a shaft to any one of a very large number of selective stopping positions and with a high order of accuracy.

A further object is to provide an automatic shaft setting arrangement having coarse and fine shaft-stopping mechanisms and associated coarse and fine electric selector switches, which, by means of a small number of control wires, can control a very much greater number of selective shaft settings.

A still further object is to provide an automatic shaft-positioning arrangement arranged to undergo automatically coarse and fine selective settings, which mechanism automatically repeats its cycle of operations if either the desired fine or coarse settings are not effected during the first selection cycle.

A feature of the invention relates to an automatic shaft-setting mechanism having coarse and fine rotatable stopping elements and co-acting stopping levers or pawls, in conjunction with respective coarse and fine cam-controlled seeking switches rotatable with said stopping elements, the selective stopping of the shaft being determined by the selective stopping of said switches.

Another feature relates to an automatic shaft-setting mechanism having coarse and fine rotatable stopping elements, in conjunction with respective coarse and fine selector switches of the hunting type, and means for operating said switches respectively at different speeds to hunt for a desired setting of said shaft and thereby to determine the selective stopping of said shaft.

Another feature relates to an automatic shaft-setting mechanism of the type wherein the shaft is automatically moved to a homing or reference position before the actual shaft-setting selection cycle, and means are provided for automatically repeating the homing motion of the shaft should it fail to reach its selected setting within a predetermined number of complete revolutions.

Another feature relates to an arrangement for automatically setting a shaft first in a coarse selection control cycle and then in a fine selection control cycle, and including coarse and fine selector switches having seeking elements rotatable from the shaft but at different rates; the coarse selector switch is arranged to be automatically coupled and uncoupled directly from the shaft to control the coarse setting at a high rate of speed, after which the coarse selector switch is stopped and the fine selector switch is driven at a much lower speed to control the fine or final setting of the shaft.

Another feature relates to a pair of rotatable selector switches of the hunting type, each of which is arranged to be driven from a shaft to determine its coarse and fine settings, in conjunction with a differential gear system which is initially effective to drive one switch at a high speed to control the said coarse shaft setting, and is thereafter automatically effective to drive the other switch at a reduced speed to control the said fine shaft setting.

Another feature relates to an arrangement for automatically setting a shaft in successive coarse and fine selection cycles, employing a coarse stop ring and a fine stop ring which are coupled in driving relation to the shaft through the intermediary of a differential gear train. During the coarse selection cycle, the differential drives the coarse stop ring at a high speed and when the coarse ring is selectively stopped, the differential automatic drives the fine stop ring at a lower rate. Each ring is rotatable in unison with a corresponding selector switch of the hunting type to determine the selective stopping of the rings and shaft.

A further feature relates to a novel or circuit arrangement and seeking switch arrangement for controlling the coarse and fine selective setting of a shaft, such as a radio tuning shaft or the like.

A still further feature relates to the novel organization, arrangement and relative interconnection of parts which cooperate to provide an improved automatic tuning control device for radio apparatus and the like.

Other features and advantages not particularly enumerated, will be apparent after a consideration of the following detailed descriptions and the appended claims.

In the drawing,

Fig. 11 is an enlarged perspective view explanatory of the operation of the device.

Figure 1:
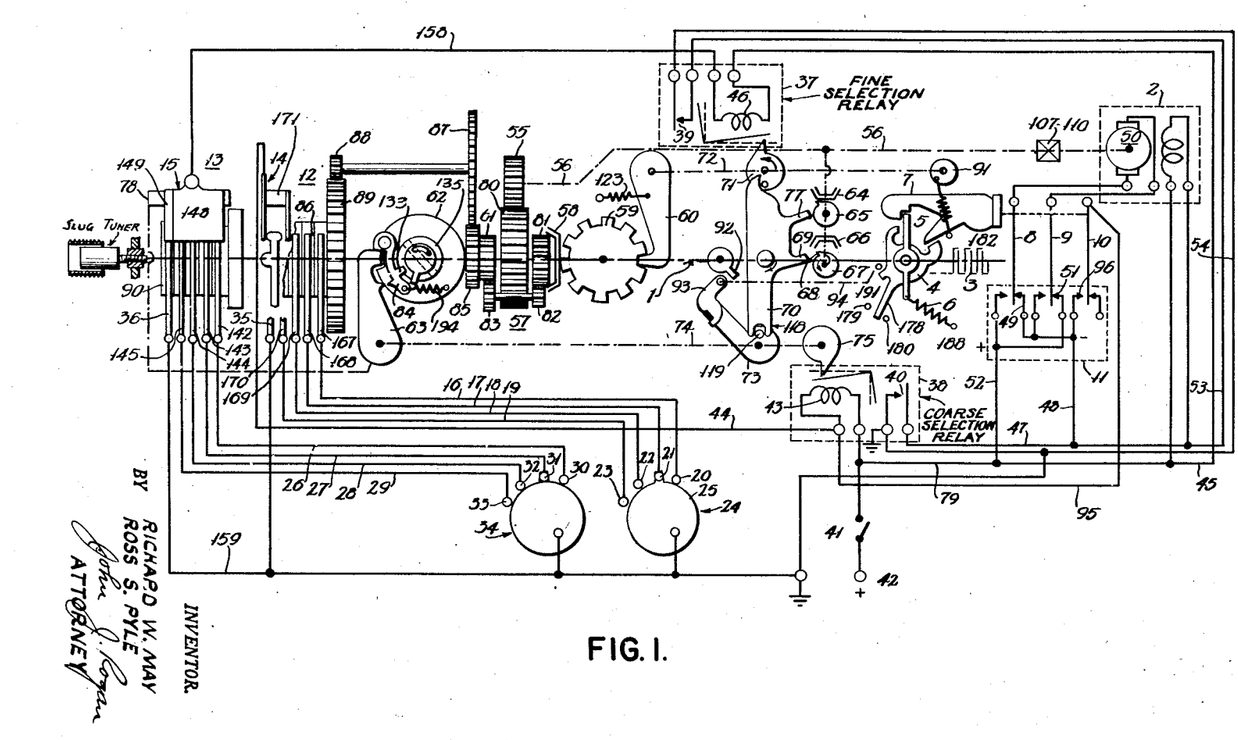
Fig. 1 is a schematic structural and electric circuit diagram of a selection system according to the invention.

Referring to Fig. 1, a description will first be given of the sequence of operations which the mechanism undergoes in making a complete selection cycle. The showing in Fig. 1 is intended to be a composite structural schematic and wiring diagram with the mechanical parts represented in somewhat different physical shape from their actual shape as shown in the detailed mechanical views of the device. However, these shapes, as illustrated in Fig. 1, are chosen so as to render the operation of the device more clear. In Fig. 1, the shaft which is to be selectively positioned in any one of ten angular orientations in any one of ten complete shaft turns, is represented by the dot-dash line 1. The motive power for the shaft 1 is supplied by a reversible electric motor 2, which is arranged, upon the initiation of a selection cycle, to first turn the shaft 1 in a forward direction until it arrives at a fixed home position. For purposes of explanation, it will be assumed that the forward direction in Fig. 1 is clockwise. The shaft 1 also drives a series of lost-motion coupling washers 3 which are coupled to a rockable member 4. During the greater part of the homing rotation of shaft 1, the washers 3 have no effect on the position of member 4. However as the shaft reaches home position, the washers 3 "take up," and causes the rocking of member 4 which in turn rotates member 5 clockwise against the tension of spring 6. This permits the member 7 to clear the end of member 5, whereupon the member 7, which is linked to the switch blades 8, 9, 10, of a motor reversing switch 11, causes the said switch to reverse the current through the armature winding of motor 2.

The motor then rotates shaft 1 in a reverse or selecting direction, counter-clockwise as seen in Fig. 1. The shaft 1 is capable of undergoing ten complete turns and is arranged to be selectively stopped at any one of ten positions in the selected one of the ten turns, thus providing one hundred different selective settings for the device which is to be controlled by shaft 1. For purposes of explanation, the turns selection will be referred to as the "coarse" selection, and the selected stopping position in each turn will be referred to as the "fine" selection. The electrical circuit for the motor during the coarse selection is controlled by a cam-operated coarse selector switch 12, and the motor circuit for the fine selection is controlled by a similar cam-operated selector switch 13. These cam-operated switches are disclosed in detail in U. S. Letters Patent No. 2,476,673, and one of them is illustrated in detail perspective in Fig. 13 of the present application. Each switch comprises a contact plate 14, 15, and an associated set of five pivotally mounted contact fingers each finger being operated by a respective cam. Four fingers of switch 12 are connected by wires 16, 17, 18, 19, to four fixed contacts 20, 21, 22, 23, of a remotely located selector switch 24. This switch may comprise for example a grounded rotatable contact plate 25 for grounding the associated contacts 20–23 in different combinations each grounded combination representing respectively one of ten different positions of the rotor 25, as described in detail in said U. S. Patent No. 2,476,673. Thus the four wires 16–19 can be grounded in accordance with the following table:

| Wire | Selective Positions of Shaft 1 | | | | | | | | | |
|---|---|---|---|---|---|---|---|---|---|---|
| | 1 | 2 | 3 | 4 | 5 | 6 | 7 | 8 | 9 | 10 |
| 16 | | | | G | G | G | | | | G |
| 17 | | G | G | | | G | | | G | |
| 18 | G | | G | | G | | | G | | |
| 19 | G | G | | G | | | G | | | |

Similarly, the pivoted contact fingers of switch 13 are connected by wires 26, 27, 28, 29, to the fixed contacts 30, 31, 32, 33, of another remote selector switch 34 similar to switch 24, and whereby the wires 26–29 can be grounded in any one of ten combinations similar to the grounding of wires 16–19. The switch 12 also has a fifth pivoted finger 35 which is an off-normal finger and which makes contact with the associated plate 14 only after the switch has started its rotary movement after the beginning of a selective cycle. This finger 35 has an associated cam which also closes it to contact with plate 14 in the intermediate positions of the cam drum when it is moving from one position to the next to insure that the cam drum is positively moved between positions. For clarity in Fig. 1, the finger 35 and its associated plate 14 are arbitrarily shown as turned through an angle of 90° with respect to the remaining fingers, it being understood that in the actual device all the fingers are pivotally mounted on a common pin for independent oscillation in parallel planes. Likewise the switch 13 has a fifth cam-controlled contact finger 36 performing the same function for switch 13 as the finger 35 does for switch 12. When the complete mechanism is at rest after having completed a previous selection cycle, neither of the plates 14 or 15 is grounded, and therefore neither the fine motor relay 37, nor the coarse motor relay 38 is energized, and at their respective contacts 39, 40, the motor circuit is held open. However when a new selecting cycle is to be effected, and assuming the main power switch 41 is closed, a circuit is traceable from the positive power terminal 42, switch 41, winding 43 of relay 38, conductor 44, member 14, and thence in parallel to the fingers of switch 12 and to the conductors 16–19. As a result of the new setting of switch 24, ground will now be found upon one of the conductors 16–19, and the corresponding finger of switch 12 will find itself in contact with plate 14. A similar circuit is traceable from the positive terminal 42, switch 41, conductor 45, winding 46 of relay 37, member 15, and thence in parallel to conductors 26–29 one of which is grounded, and the corresponding finger of switch 13 finds itself in contact with plate 15. Relays 37 and 38 therefore move their respective armatures from the full-line position to the dotted line position. At the same time that relay 38 closes its contacts 40, a circuit is closed through those grounded contacts, conductor 47, conductor 48, reverse switch contacts 49, 8, motor armature 50, reverse switch contacts 9, 51, conductor 52, switch 41, to the positive terminal 42. At the same time, the contacts 39 of relay 37 connect the wires 53 and 54 directly together, thus making sure that ground is applied to conductor 48 independent of the operation of relay 38. In other words, the motor circuit is closed as long as either relay 37 or 38 is operated. Thus the motor 2 rotates the shaft 1 in a homing or clockwise direction.

The motor does not drive the shaft 1 directly, since it is connected to that shaft through a driving gear 55 attached to the shaft 56. Gear 55 is in mesh with a gear 80 of a differential gear train 57 and thence through slip friction clutch 58 to the fine toothed stopping ring 59 keyed to shaft 1. Wheel 59 has ten equally spaced stopping teeth for co-action with a pivotally mounted stopping pawl 60. The differential 57 is also coupled through a gear 61 and a single notched ring 62 to shaft 1, the stopping of the ring 62 and shaft 1 being controlled by a pivoted pawl 63.

The shaft 56 also drives a single-turn clutch 64 and a pawl actuator 65 which in turn is connected through a slip friction clutch 66 to another pawl actuator 67. As soon as shaft 56 starts rotating in the homing direction, it rotates member 67 in a counter-clockwise direction and at the end of a single revolution of this member 67, the tooth 68 thereof engages a projection 69 on a pivotally mounted pawl 70. The upper end of pawl 70 rotates the latch member 71 in a counter-clockwise direction, and the shaft 72 to which this member is fastened. When the latch member 71 is thus rotated, it engages a slot in the armature of relay 37 so that the shaft 72 is locked in its rocked position where the pawl 60 is clear of the teeth in wheel 59. Pawl 70 also oscillates the pawl 73 counter-clockwise. Pawl 73 is fastened to a shaft 74 which also carries the latch 75 which co-acts with the armature of relay 38 when the latter is energized to lock the shaft 74 in its counter-clockwise rocked position, and thus holds the pawl 63 out of engagement with the ring 62. Shaft 74 is also connected to the member 76 which rocks the contact plate 15 away from the associated contact fingers. At the end of the first revolution of shaft 56, the actuator 65 engages another projection 77 on pawl 70 and disengages the projection 69 from actuator 67, thus stopping any further rotation of actuator 67, and causing the clutch 64 to slip. The purpose of raising the contact plate 15 from contact with the fingers of switch 13 as above described, is to prevent the motor being stopped while it is moving the various parts to home position.

It should be observed that during the homing movement, the relay 38 is held electrically locked over a circuit traceable from positive terminal 42, switch 41, conductor 79, conductor 52, contacts 57, 9, armature 50, contacts 8, 49, conductor 48, conductor 47, through the grounded contacts 40. This prevents the release of relay 38 should the switch 12 find an ungrounded condition at its plate 14 while the mechanism is returning to home position.

Figure 4:
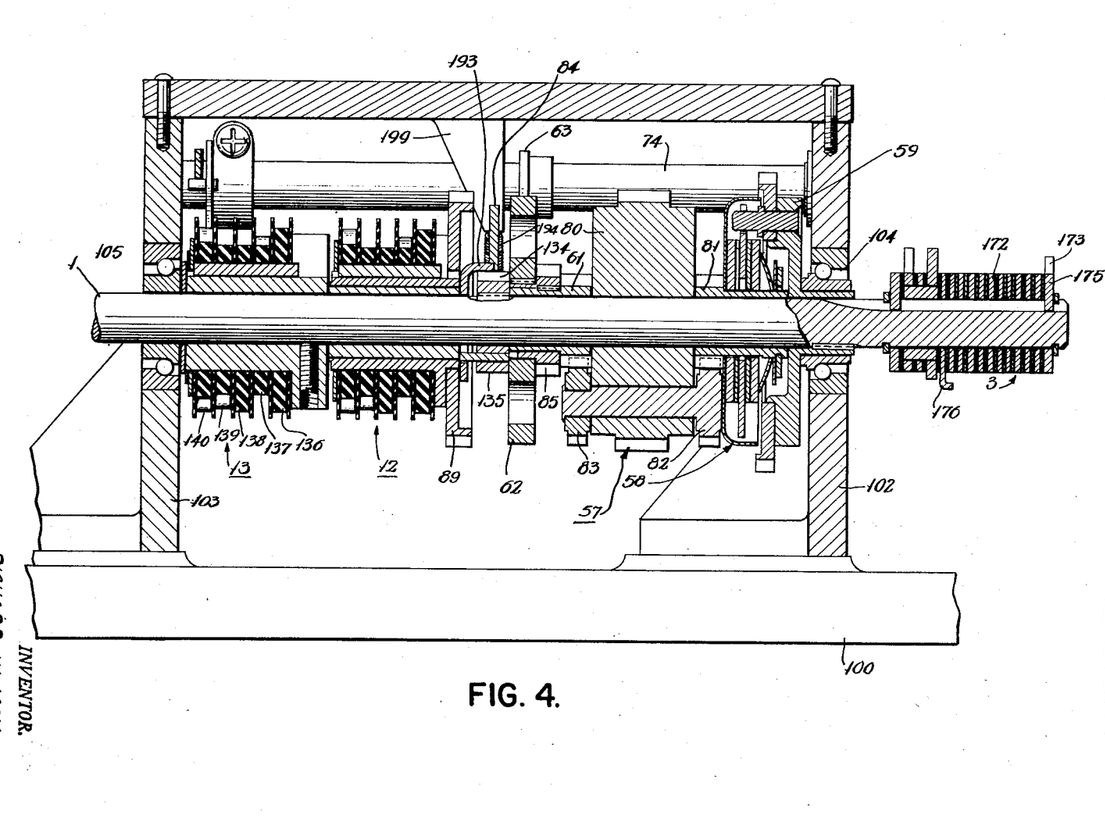
Fig. 4 is a sectional detail view of Fig. 3, taken along the line 4—4 thereof and viewed in the direction of the arrows.

As pointed out above, the motor drives, through gears 55 and 80, a differential gear train comprising gears 81, 82, 83, 61. As well-known in the gearing art and as shown in Figs. 1 and 4, the gears 82 and 83 are of different sizes. For example, gear 83 may have twenty teeth and gear 82 may have nineteen teeth. This differential is arranged to be locked, during the coarse selection, so that shaft 1 rotates at the same speed as gear 80, and under control of a pawl 84 carried by ring 62. This results in a fast rotation of shaft 1. The cam drum 86 of switch 12 is driven at a ten-to-one step-down ratio from ring 62 through the gears 85, 87, 88, 89. The cam drum 90 of switch 13 is driven directly from shaft 1, but the contact fingers of this switch are held disengaged from the contact plate 15 until the coarse selection switch 12 has completed its selective cycle.

When the motor has driven shaft 1 to its home position, as described hereinabove, the lost-motion washers 3 become effective to operate members 4, 5 and 7, as above described, thus causing the motor to reverse its direction of rotation. During this reverse rotation, the ring 62 rotates, and through the intermediary of pawl 84 the differential gear system 57 again bodily rotates to drive the shaft 1 in its selective direction at the same fast speed under control of gear 80. The shaft 1 therefore keeps turning at this fast rate until the plate 14, in conjunction with the cam drum 86 and its associated contact fingers, finds an ungrounded condition. When that occurs, the winding 43 of relay 38 becomes de-energized. It should be noted that the previously described electrical locking circuit for relay 38 through the contacts 57, 9, of the motor reversing switch, was broken when the said switch was operated by member 7. The release of relay 38 unlatches its armature from member 75, thus unlocking members 63 and 76, and permitting plate 15 to move into contacting position with relation to the associated contact fingers of switch 13. The pawl 63 now enters a single notch in the ring 62. At the same time, the pawl 84 is shifted, resulting in the stopping of any further rotation of the coarse stop ring 62, and maintaining the previous selective setting of switch 12 and shaft 1. However since ring 62 and gear 85 are now positively stopped, the differential gear system now comes into play, to drive the fine stop ring 59 at a slower rate through a torque-limiting slip friction clutch 58. Cam drum 90 of switch 13 and also shaft 1, therefore continue rotating at this reduced speed, until the plate 15 becomes ungrounded, representing the final stopping point of shaft 1. Thereupon the previously described energizing circuit for relay 37 is broken, and this relay releases its armature to the full-line position, thus unlatching member 71, and permitting the shaft 72 with its members 60 and 91 to rock clockwise. When the relay contacts 39 are thus opened, the power circuit for motor 2 is likewise opened, and at the same time the pawl 60 drops into the proper notch on disc 59 whose angular position corresponds to the above-described selective stopping position of switch 13. Thereupon the clutch 58 slips, until the motor coasts to a dead stop. Since member 91 is now unlatched, it allows the member 7 to become unlatched from member 5, and member 7 thereupon operates the switch 11 to the original position in readiness for the beginning of a succeeding selective cycle.

If the mechanism does not stop the shaft 1 properly, either during the fine or coarse selections, a mechanical interlock is provided which automatically reverses the direction of the motor rotation to restore the shaft 1 to its home position, whereupon the above-described selecting cycle is automatically repeated. Thus if the coarse selection does not properly occur the first time as above described, the lost-motion washers 3 eventually take up and actuate the member 4 to reverse the switch 11. If, however, the coarse selection properly takes place and pawl 63 falls into the notch in ring 62 as above described, the pawl 73 falls within the range of a dog 92 keyed to shaft 1. Therefore, if the fine selection does not occur within one revolution of shaft 1, after the coarse selection has been completed, the member 93 linked to pawl 73 rocks shaft 94 whereby member 4 is mechanically turned to unlatch member 7 which thereupon automatically reverses the motor rotation, and the mechanism thereafter automatically repeats the fine selecting sequence as above described.

It should be observed that when the shaft 1 is to be moved to a different setting, this new setting may still be in the same coarse turn as a previous setting, in which event only the fine selective mechanism comes into play. Under that condition, the relay 38 is pulled in or operated over a circuit traceable from positive terminal 42, switch 41, winding 43, conductor 95, contacts 10, 96, conductor 48, conductor 53, contacts 39, conductor 54, to the ground at contact 40. If, however, the new setting requires only a change in the coarse setting, the pawls 60 and 63 are lifted out of the notches in their respective rings 59, 62, and coarse pawl 63 and its associated elements are latched by the armature of relay 38, pawl 60 is also maintained out of engagement with its ring 59. The ring 62 therefore rotates until the member 84 enters the slot in shaft 1, whereupon the unit begins running towards its home position at its fast speed. It should be noted that switch 12 completes the ground return to the winding of relay 38 as soon as switch 12 moves from its normal position. Thereafter the tuning cycle automatically ensues as described above.

Figure 2:
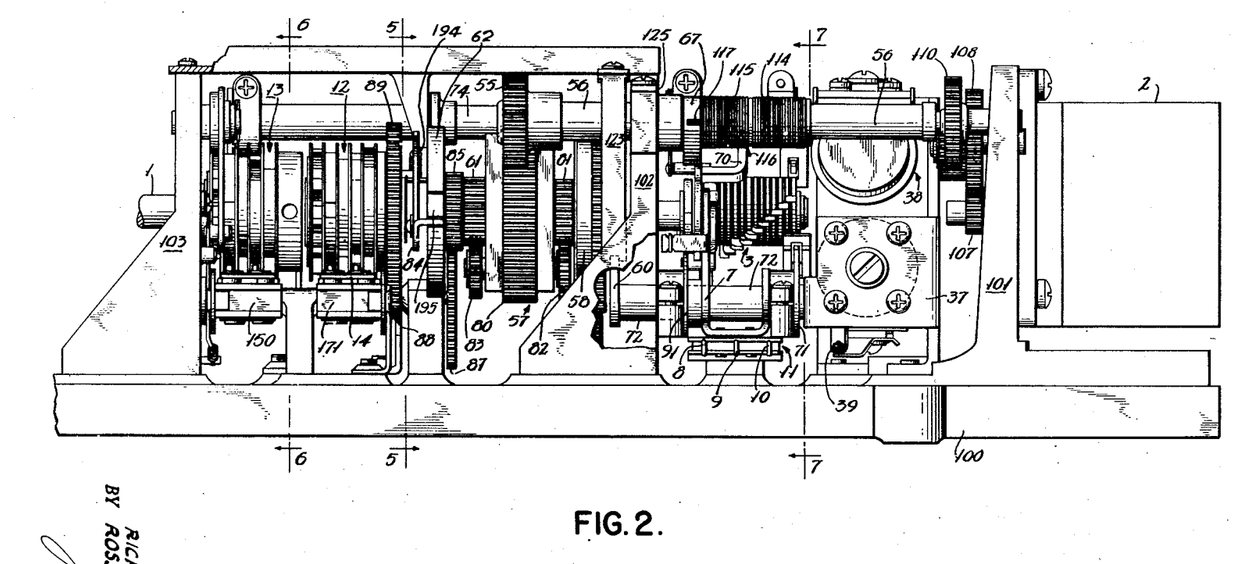
Fig. 2 is a front view of the selecting device according to the invention.
Figure 2:
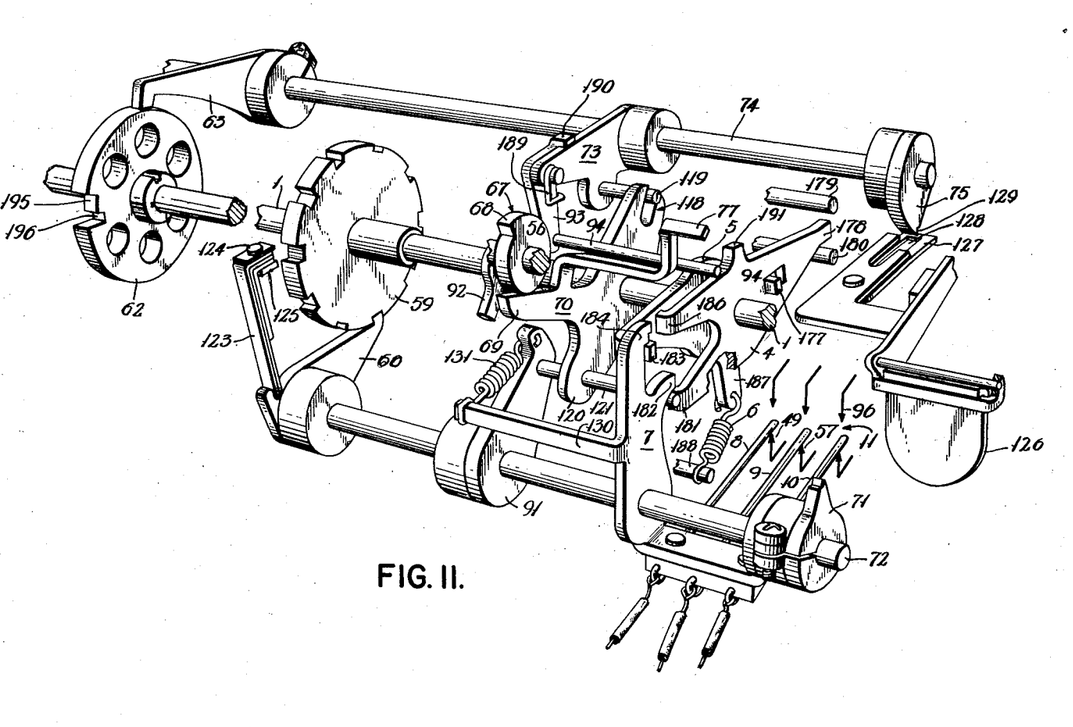
Figure 3:
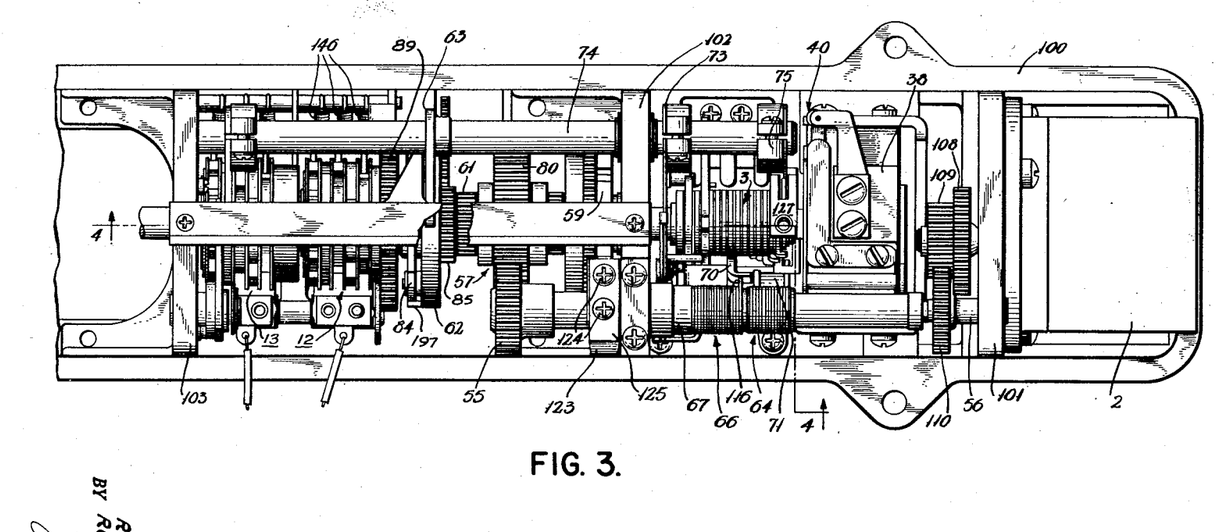
Fig. 3 is a top-plan view of Fig. 2.
Figure 7:
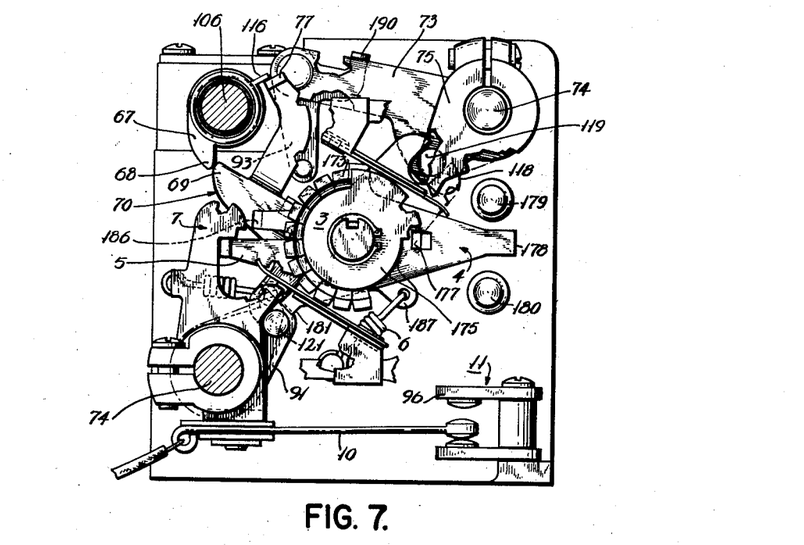
Fig. 7 is a cross-sectional view of Fig. 2, taken along the line 7—7 thereof and viewed in the direction of the arrows.
Figure 12:
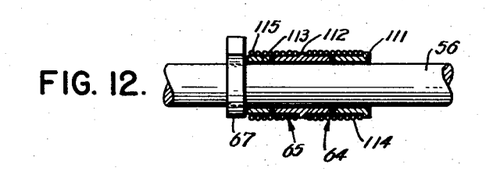
Fig. 12 is a detailed view of a double spring clutch used in the device.

Referring to Figs. 2, 3 and 4, the mechanism according to the invention is supported on a metal base plate 100 having vertical brackets 101, 102, 103, rigidly fastened thereto. Brackets 102, 103 have suitable end-thrust ball bearings 104, 105 in which is rotatably supported the main shaft 1, whose position is to be automatically and selectively set. Attached to the bracket 101 is the motor 2. Supported for rocking rotation in the brackets 102, 103, is the shaft 72; and supported for rocking rotation in the brackets 101, 102 is the shaft 56. By means of speed-reducing gear trains 107, 108, 109, 110, the motor drives the shaft 56 at a suitable speed, gear 55 as pointed out above is attached to shaft 56 and provides the driving power for the differential 57. Also supported for rotation on shaft 56 is the pawl actuator 67 and spring clutches 64, 66, which serve to control the intermittent single turn rotation of member 67 as shown more clearly in Fig. 12. These spring clutches comprise a shouldered sleeve 111 pinned to shaft 56, a second shouldered sleeve 112 free to rotate on shaft 56, and a third sleeve 113 also free to rotate on shaft 56. A coiled spring 114 snugly fits around the adjacent ends of sleeves 111 and 112, and its ends press against the shoulders on sleeves 111 and 112. A second coiled spring 115 extends over the adjacent ends of sleeves 112 and 113 and fits snugly therearound. The right-hand end 116 of spring 115 is bent at right angles so as to be in the path of a lug carried by the pawl 70 (see Fig. 7). The other end 117 of spring 115 engages in a notch in the periphery of member 67. In the normal operation, with shaft 56 rotating in such a direction as to drive the mechanism in the homing direction, springs 114 and 115 coil tightly around their respective driving and driven elements, and power is transmitted by member 67 to pawl 70. As shown more clearly in Fig. 7, when the member 67 rotates clockwise sufficiently to cause the tooth 68 to engage the projection 69 on pawl 70, it rotates this pawl counter-clockwise as seen in Fig. 7, so that the lug 77 is interposed in the path of the spring end 116. This effectively decouples the member 67 from shaft 56. The bifurcated end 118 of pawl 70 (see Fig. 11) is in engagement with a pin 119 carried by the pawl 73, and thus causes pawl 73 and shaft 72 to be rocked clockwise, thus disengaging the pawl 63 from the wheel 62. Passing loosely through a lug 120 on pawl 70 is a pin 121 which is fastened to a rocking member 91 fastened to shaft 74 which also carries the latch member 71 and the fine locking pawl 60. Pawl 60 is normally urged against the fine stopping wheel 59 by a leaf spring 123 which is rigidly anchored at its upper end by screws 124 to a plate 125 fastened to the upright 102. Thus the engagement between member 67 and pawl 70 causes the two pawls 60 and 63 to be disengaged from their respective stop wheels 59, 62. On the second revolution of spring 115, as above-mentioned, the spring end 116 engages lug 77, thus tending to uncoil spring 115 and cause member 67 to be effectively disengaged from shaft 56 during the homing direction, and preventing further cocking action of the pawl mechanism. On the other hand, when the mechanism is rotating in its selecting direction, the lug 77 causes spring 114 to unwind and thus allows free rotation of shaft 56 without any rotation of member 67. In other words, the two spring clutches 64, 65 serve only to allow one complete revolution of member 67 which is necessary for cocking the various pawl mechanisms, and after these mechanisms have been cocked, the member 67 is disengaged from shaft 56 as already described hereinabove in connection with Fig. 1.

As shown in Fig. 11, the armature 126 of the fine selection relay, integrally carries a slotted member 127 whose slot 128 registers with the tooth 129 of the latching member 75 to lock the pawls 60 and 63 out of engagement with their respective wheels 59, 62. The member 7 above described, is the member which controls the setting of the motor reversing switch contacts 8, 9, 10. It should be noted that the member 7 has an arm 130 which is linked by spring 131 to the rocking member 91. The member 7 is loose to rock on shaft 74, but its rocking motion is limited by a lever 5 whose action will be described hereinbelow. Suffice it to say at this point, that the member 5 holds the member 7 in the position shown in Fig. 11 until the shaft 1 has reached its home position.

Figure 5:
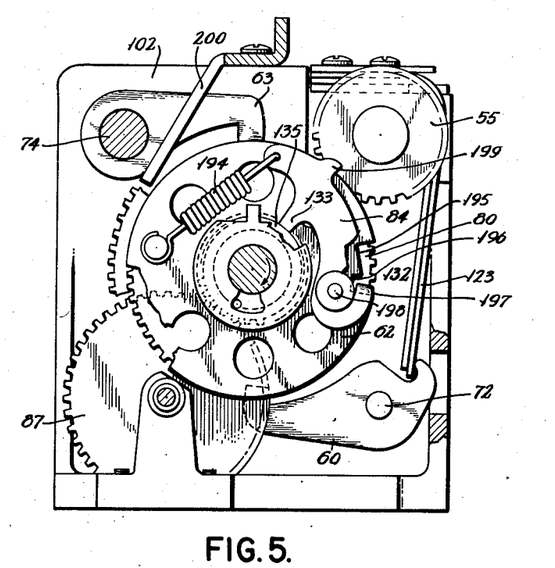
Fig. 5 is a sectional view of Fig. 2, taken along the line 5—5 thereof and viewed in the direction of the arrows.

The means by which motive power is transmitted to shaft 1 is most clearly shown in Fig. 4. As pointed out above, the coarse switch 12 is arranged to be driven at a relatively high rate through the gear train 83, 61, 85, 87, 88 and 89. On the other hand, the fine switch 13 is keyed directly to the shaft 1, and is driven through the gear train 82, 81 and the clutch 58. Gear 80 which is free to rotate on shaft 1, has mounted on it two gears 82, 83, of the differential gear train 57. Gears 82, 83, respectively engage gears 81, 61. Gear 61 drives the coarse stop ring 62 and the pawl 84 which is pivotally attached to ring 62 at the pivot 132 (Fig. 5). Pawl 84 has an inwardly extending tooth 133 which is adapted to register with a recess 134 in a collar 135 pinned to shaft 1. This causes a direct drive from gear 61 to shaft 1 during that part of the selecting cycle which terminates in the positioning of shaft 1 in the desired one of ten turns, that is, during the first or coarse selection. During the second or fine selection, the shaft 1 is driven by gear 81. Gear 81 drives shaft 1 through the slip friction clutch 58 which serves as a torque-limiting device for the fine stop ring 59 which is keyed to shaft 1.

From an examination of this gear train, it will be seen that engagement of pawl 84 with collar 135 locks the coarse stop ring 62 to shaft 1, and forcing the entire differential to rotate as a unit with shaft 1. This results in a slower rotation of the shaft 1. The coarse seeking switch 12 is free to rotate on shaft 1 and is driven through a ten-to-one step-down gear ratio by means of gears 86, 87, 88, 89 (see Figs. 2 and 4). The fine seeking switch 13 is keyed to shaft 1 to rotate as a unit therewith. The slip-friction clutch 58 is interposed between gear 81 and the shaft 1 so that when the shaft 1 is positively stopped by interengagement between members 59 and 60, any further rotation of the motor will not result in distortion or breaking of the parts.

Figure 6:
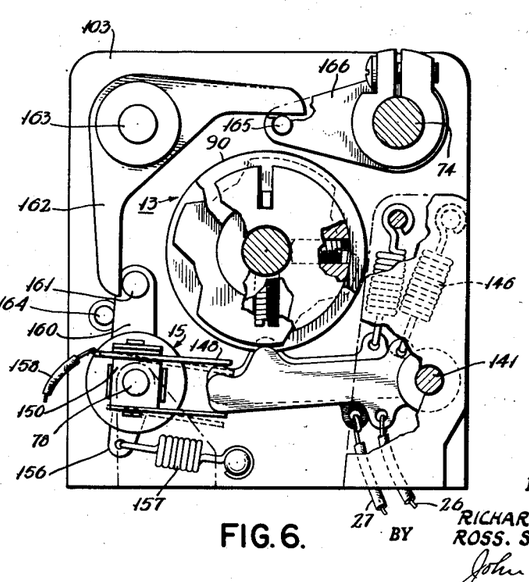
Fig. 6 is a sectional view of Fig. 2, taken along the line 6—6 thereof and viewed in the direction of the arrows.
Figure 13:
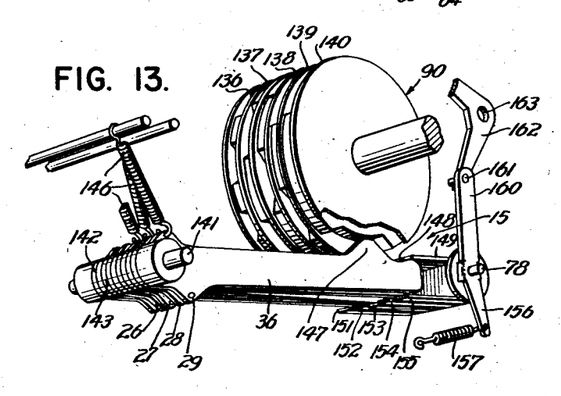
Fig. 13 is an enlarged perspective view of one of the cam-controlled switch arrangements used in the device.

As shown more clearly in Figs. 4, 6 and 13, the switch 13 comprises a set of five ring cams 136–140 of insulation material, which are suitably pinned to shaft 1. Rockably supported on a pin 141 are five contact fingers 142, 143, 144, 145, 36, one for each of the cams 136–140, and each normally urged by respective springs 146 so that their toes 147 ride against the respective cams. Mounted parallel to pin 141 is the rocking shaft 78 which carries the contactor plate 15. Preferably this plate is in the form of a relatively wide flexible metal strip 148 which overlies the ends of fingers 142–145, and a narrow flexible metal strip 149 which overlies the finger 36. Plate sections 148 and 149 are attached to an insulator block 150 which is fastened to rock shaft 78.

Also attached to the lower face of block 150 are five separate narrow flexible spring strips 151–155, one for each of the fingers 142–145 and 36. Attached to a downwardly extending lug 156 (Figs. 6 and 13) is a spring 157 which tends to rock the block 150 to the full-line position wherein the spring contacts 151–155 engage the lower edges of the respective fingers 142–145 and 36. However, the block 150 is of sufficient thickness so that when a finger, e. g., finger 36, is riding on the high part of the associated cam, it is out of contact with the upper spring 149. A conductor 158 which leads to the winding 46 of relay 37 (Fig. 1), is connected to strips 148, 149, and the finger 36 is connected to the grounded conductor 159. During the coarse selecting portion of the cycle, the block 150 is rocked to bring contact springs 148, 149, to the dotted line position (Fig. 6), wherein all the fingers 142–145 and 36 are in contact with the respective plates, thus insuring grounding of conductor 158 and closure of the circuit of relay 37 for purposes described in connection with Fig. 1.

The mechanism for rocking the block 150 and its attached contact springs, comprises an upwardly extending lug 160 attached to block 150 and carrying a pin 161 which abuts against the downwardly depending arm of an L-shaped lever 162 which is pivotally supported on a pin 136 attached to upright 103. The spring 157 normally holds the pin 161 in contact with the lever 162 and against a fixed back stop 164 on upright 103. The horizontal arm of lever 162 engages a pin 165 carried by an arm 166 fastened to shaft 74.

The fine selector switch 12 is similar in construction to switch 13 and comprises a five-ring cam drum 86 which together with gear 89 is rotatable on shaft 1, and a set of five pivoted fingers 167–170 and finger 35, all of which are pivotally mounted on the shaft 144 and normally urged against the respective ring cams by springs 146. The free ends of the pivoted fingers 167–170 of switch 12 are adapted to be moved by their respective cams into and out of engagement with a contactor plate 14 carried by an insulator block 171. The plate 14 can be made in two sections, one a wide section which cooperates with the fingers 167–170 and the narrow strip section which cooperates with finger 35. When the fingers are on the low point of their respective cams, they are in electrical contact with the plate 14, and when they are on the high point of their respective cams, they are out of contact with the plate 14. The block 171 is fixedly mounted with respect to the associated pivoted fingers and to that extent differs from the block 150 which is pivotally mounted. The fingers 167–170 are connected to conductors 16–19 (Fig. 1) and the finger 35 is connected to the grounded conductor 159 for purposes already described in connection with Fig. 1.

The purpose of the fifth cam 140 and finger 147 of switch 13 and of the corresponding fifth cam and finger 35 of switch 12, is to make sure that the motor circuit is maintained closed as the two switches are moving between successive rotary positions. Thus each of these fifth cams has a series of ten equally-spaced short raised portions which connect the grounded conductor 159 either to wire 44 in the case of switch 12, or to wire 158 in the case of switch 13. The grounding of wire 44 controls the circuit of relay 33 and the grounding of wire 158 controls the circuit of relay 37. In other words, the fifth cam of each switch and its associated finger 36 or 35, acts in the nature of a synchronizing arrangement for making sure that the shaft 1 is positively advanced between each selective position.

Figure 14:
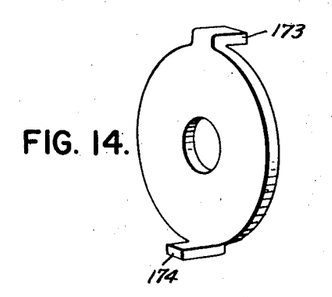
Fig. 14 is a detailed view of one of the lost-motion washers used in the device.

As shown in Figs 2, 3, 4 and 5, the right-hand end of shaft 1 carries a lost-motion device 3, comprising a series of lost-motion washers 172, one of which is shown in Fig. 14. Each washer has a pair of diametrically opposite teeth 173, 174, which are bent at right angles but in opposite directions. Only the first washer 175 of the series is keyed to shaft 1, and it requires a half-turn of shaft 1 before its tooth 173 engages the corresponding tooth 174 of the next adjacent washer, all the washers except washer 75 being loosely mounted for rotation around shaft 1. A sufficient number of washers are provided so that it requires slightly more than ten complete turns of shaft 1 before the rotary motion of this shaft is transmitted to the last washer 176. The last washer is adapted to engage a right-angled lug 177 (Fig. 11) struck up from the body of the lever 4 which has a tail portion 178 movable between fixed stops 179, 180. The forward end of member 4 is bifurcated, the lower bifurcation 181 adapted to engage the projection 182 on the reversing switch member 7 to rock the latter against the tension of spring 131 and thus to reverse the motor switch 11 as described in connection with Fig. 1. The lost-motion device 3 therefore acts as a homing stop control for the shaft 1. During the reverse or selecting movement of shaft 1, this lost-motion device also acts to control an interlock to prevent overtravel of the shaft 1 in the event of a faulty coarse selection cycle as will be explained. Also mounted on the right-hand end of shaft 1 is a pawl 5 (Figs. 7, 8, 9, 10 and 11), having a right-angled lug 183 which is adapted to latch underneath the double shouldered end 184 of member 7. The lug 183 is also arranged to be interposed in the path of the other bifurcated arm 186 of pawl 4. The member 5 has a downwardly depending lug 187 which is connected by spring 6 to a fixed stop 188, thus tending resiliently to hold the lug 183 against the shoulder portion 184 of member 7. If the coarse selection of shaft 1 is not completed within the full ten turns of the shaft, the lost-motion device 3 takes up and rocks pawl 4 downwardly to cause arm 186 to engage the projection 182 on member 7 for purposes to be described. It will be understood that emembers 4, 5 and 76 are freely rockable on shaft 1.

Pivotally supported on member 73 is the downwardly depending member 93 which by means of spring 189 is urged forwardly to maintain the right-angle lug 190 in engagement with the edge of member 73. When the mechanism is undergoing coarse selection, the member 73 is locked in the raised position shown in full lines in Figs. 7, 8 and 9 In this position, the member 73 is out of the path of the dog 92, fastened to shaft 1. As soon as the coarse selection is made and the pawl 63 drops into the notch 195, the member 93 is lowered to the full-line position shown in Fig. 10 so that it is in the path of the dog 92. At the end of the next complete revolution of the shaft 1, the dog 92 engages member 93 and pushes the pin 94 against the projection 191 on member 4 to rock this member clockwise and again reversing the motor direction to restore the shaft 1 to its home position. In other words, if the fine selection is not completed within one complete turn of shaft 1 after the coarse selection has been completed, the shaft is automatically reversed to its home position and repeats the foregoing selecting cycle. When the shaft reaches its home position, the lost-motion device 3 again comes into play to control the selecting rotation of the shaft.

Figure 15:
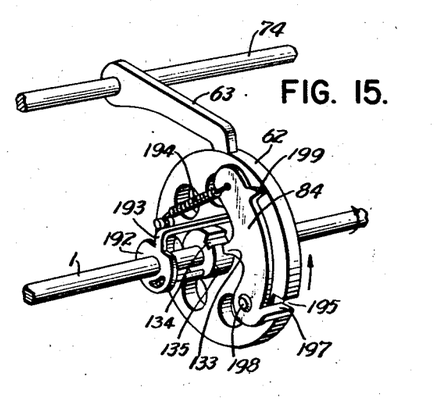
Fig. 15 is a perspective view of certain shaft-coupling and stopping elements of the device.
Figure 16:
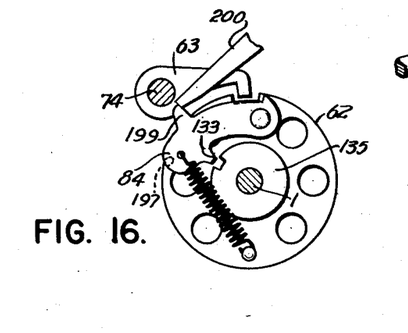
Fig. 16 is an end view similar to that of Fig. 15, showing a different relation of the stopping elements.

Attached to shaft 1 (Figs. 4, 5 and 15) is a disc 192, which carries a right-angled arm 193 so that if the shaft 1 does not make its fine selection during the first complete revolution after the coarse selection, the arm 193 engages the pawl 84 to rock it counter-clockwise as seen in Fig. 15, thus preventing the tooth 133 from entering the notch 134 and preventing the differential from driving the shaft 1 at the high speed ratio. When the mechanism is running in the homing direction in the position shown in Fig. 15 where it is disengaged from driving engagement with the sleeve 135, the shaft 1 continues to rotate until the home position is reached whereupon the motor rotation is reversed under control of the lost-motion device 3 as above described. Pawls 84, ring 62 and shaft 1 then rotate in a counter-clockwise direction until the pawl 63 drops into the notch 195 in accordance with the complete number of turns as determined by the setting of the remote control switch 24. At that instant, the relay 38 (Fig. 1) releases to unlatch shaft 74 and permit pawl 63 to enter notch 195 and stop the ring 62. However, this does not prevent further rotation of shaft 1. As shown in Figs. 5 and 15, the pawl 84 has one end connected to a spring 194, the other end of which spring is anchored to ring 62. The notch 195 into which the stopping pawl 63 drops, has another undercut portion 196 and the pawl 84 has a right-angled portion 197, which registers with the notch 195. The length of the tooth of pawl 63 is slightly less than the circumferential length of notch 195, so that when the said pawl tooth enters the said notch any further slight rotation of ring 62 causes pawl 84 to rotate clockwise around its pivot 198 sufficiently to withdraw tooth 133 from the recess in driving sleeve 135, thus disengaging the ring 62 from driving engagement with shaft 1. Pawl 84 also has a peripheral tooth 199 so that when the pawl is rocked clockwise as above described, it abuts against a rigid stop 200 which effectively locks the coarse stop ring assembly in its selected position and prevents its creeping away from that selective position during the subsequent fine rotation of shaft 1. It will be understood, of course, that when the pawl 84 has its tooth 133 in the slot 135, the tooth 199 is out of the path of the rigid stop 200.

Figure 8:
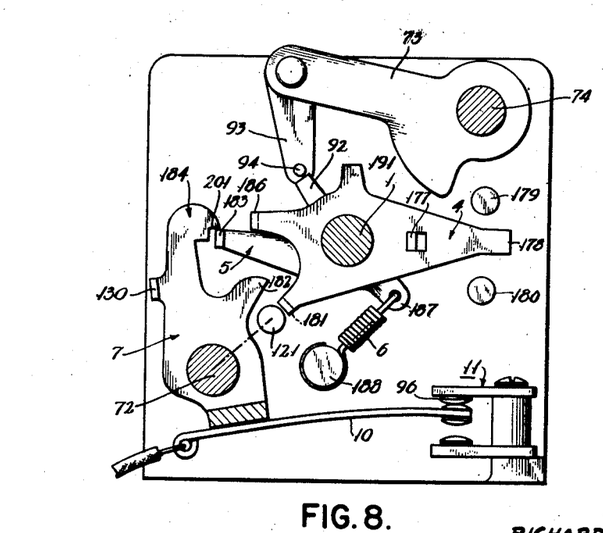
Figs. 8, 9 and 10 are detailed fragmentary views of certain portions of the device illustrating the automatic interlock and motor control mechanism.

Figs. 7, 8, 9 and 10 show in more detail the various interlocking pawls which control the reversal of the motor after the mechanism reaches home and if it fails to execute its coarse and fine selections on the first attempts. During the first revolution of member 67 in a clockwise direction, as above described, member 70 is rocked counter-clockwise. Fig. 8 shows the relation of the parts when the mechanism is at rest after having completed a previous coarse and fine selection cycle, and it also represents the relation of the parts as shaft 1 is moving towards home position. It will be seen that the member 7 has been moved by member 67 so that the lug 183 of member 5, under the pull of spring 6, latches the lug 183 against the shoulder 201, thus holding shaft 72 and the contacts of switch 11 in a position whereby the motor 2 drives the shaft 1 in its homing direction. During this homing rotation, the shafts 72 and 74 are of course latched in position by their respective relays 37 and 38 to hold pawls 60, 63, away from their respective stop rings 59, 62.

Figure 9:
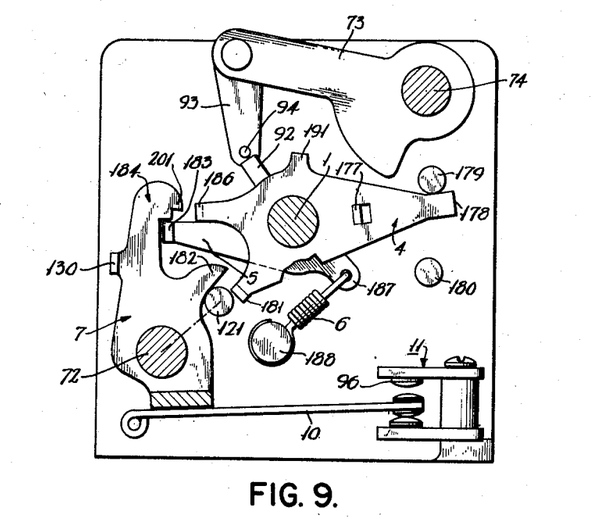

When the shaft 1 reaches its home position, the relation of the parts is shown in Fig. 9. At this time the lost-motion device 3 takes up and acts on lug 177 to rock member 4 counter-clockwise. The lug 186 then engages member 5 and also rocks the latter member counter-clockwise, thus unlatching lug 183 from shoulder 209 and allowing member 7 to rock clockwise. This moves switch arms 9, 10, 11, to their lower positions as shown in Fig. 9, whereby the motor rotates shaft 1 in its selecting direction. The rocking motion of member 4 is limited by the rigid stops 179, 180. In the home position of the mechanism, stop 179 therefore serves as the home-limit stop through the intermediary of member 4 and the lost-motion device 3. At the end of the selection cycle, the member 180 serves as the opposite end limit stop.

Figure 10:
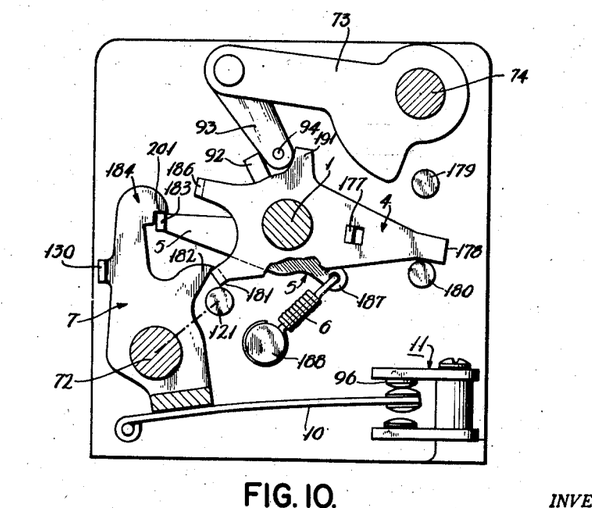

When the shaft 1 is turning in the selective direction, the relation of the parts is shown in Fig. 10. The shaft 1 is rotated in a clockwise direction which continues until coarse pawl 63, as a result of the deenergization of relay 38, falls into a notch 195, and until the fine pawl 60 as a result of the deenergization of relay 37 has fallen into the proper notch on wheel 59 which notch corresponds to the desired incremental turn of shaft 1 subsequent to the coarse setting thereof and which also corresponds to the final desired setting of the said shaft 1. At this point, the pin 121 which is attached to member 70 (see Fig. 11) is rocked together with a fine pawl control shaft 72 and engages member 7 to rock it counter-clockwise restoring the various elements to the relation shown in Fig. 8. When the fine and coarse selections have thus been completed, and the relays 37 and 38 are finally released, the motor coasts to a dead stop but the selected position of shaft 1 is not disturbed because of the slip-friction clutch 58.

In the event that because of some faulty operation, the coarse pawl 63 does not stop the shaft 1 within ten complete turns of that shaft, the lost-motion device 3 engages lug 177 to rock member 4 in a clockwise direction (Figs. 7–11) which results in rocking members 5 and 7 also in clockwise direction to move the switch arms of switch 11 to their upper position. This causes the motor to rotate shaft 1 to its home position as indicated in Fig. 8 after which the coarse tuning cycle is automatically repeated.

In the event that the coarse cycle is concluded satisfactorily, but if the fine selection cycle is not concluded thereafter within one complete turn of shaft 1, the above-described automatic repeat interlock mechanism is brought into play. Thus, after the coarse pawl 63 drops into the notch 195, member 93 is in the lower position shown in Fig. 10. In this position, it is brought into engagement with the driving dog 92 so that if the fine selection has not taken place the pin 94 on member 93 engages the lug 191, rocking member 4 in a clockwise direction, and thus rocking member 7 counter-clockwise to return the switch arms 8, 9 and 10 to their upper positions as shown in Fig. 8. This again results in the motor driving the shaft 1 in its homing direction after which the selecting cycle automatically repeats itself in the manner already described, until the final selected setting of shaft 1 is reached.

Summarizing the above, the following is the sequence of operations in setting the mechanism.

1. The two remote switches 24, 25 (Fig. 1) are set to their new position and the power is turned on by closing switch 41.

2. Relays 37 and 38 pull in because of the grounded condition of wires 158, 159, through selector switches 12 and 13.

3. Parallel connected contacts on switches 37 and 38 close the power circuit to the field winding of motor 2 through reversing the switch 11 and motor armature 50.

4. Motor 2 rotates shaft 1 in its homing direction.

5. On the first revolution of the motor in the homing direction, member 67 actuates member 70. Member 70 then disengages member 67.

6. Member 70 actuates latch members 71 and member 91 to lock shaft 72 and pawl 60 under control of relay 37.

7. Member 70 actuates members 75, 73 and 63, and disengages member 148 from the switch fingers. Relay 38 remains energized while shaft 1 is returning to home position.

8. The motor drives gears 55 and 89 and through differential 57 it drives wheel 59 and shaft 1 at high speed.

9. The cam drum of switch 12 is driven at a ten-to-one step-down ratio from disc 62 through gears 61, 85, 87, 88, 89.

10. The cam drum of switch 13 is driven directly from shaft 1 but the plate 148 is disconnected from ground until the shaft 1 has completed its coarse selection.

11. The motor continues to drive the mechanism in the homing direction until the lost-motion device 3 takes up.

12. The lost-motion device 3 moves members 4, 5 and 7, to reverse the motor switch contacts. Further rotation of shaft 1 is stopped and the clutch 58 slips.

13. Disc 62 is then driven in the selecting direction until pawl 84 couples this disc to shaft 1 again driving the differential 57.

14. Switch 12 finds an ungrounded condition and relay 38 releasing members 75, 63 and 148.

15. Member 63 engages notch in disc 62 and disengages disc 62 from shaft 1. This stops further rotation of ring 62 and maintains the selective setting of switch 12. The differential 57 drives the drum of switch 13 at a slower speed through the slip-friction clutch. Switch 14 finds an ungrounded condition as it reaches the final setting releasing relay 37 and members 71, 91 and 60.

16. The contacts 39 open the motor power circuit.

17. Member 60 enters the correct notch in wheel 59 and clutch 58 slips until the motor 2 coasts to a dead stop. Member 91 through member 7 restores the switch contacts to their reversing position making them ready for the next desired tuning cycle.

While the mechanism has been described for controlling a shaft with ten coarse turns and with ten fine settings in each turn, it will be understood that this is done merely for illustrative purposes and the mechanism may be designed to set the shaft in a greater or less number of total turns, and a greater or less number of fine settings in each turn.

While one particular mechanism has been described herein, it will be understood that various changes and modifications may be made therein without departing from the spirit and scope of the invention.

What is claimed is:

1. Apparatus of the character described for selectively setting a rotatable shaft which is required to undergo either a fractional revolution or more than one complete revolution before arriving at its selected setting, comprising, coarse selection control means to determine the coarse setting of said shaft, fine selection control means for determining the incremental fine setting of said shaft, each of said coarse and fine selection control means including a respective and separate shiftable stop member, and coarse and fine selector switches of the seeking type associated respectively with said coarse and fine selection control means for controlling the selective operation of said shiftable stop members in sequence.

2. Apparatus according to claim 1, in which said coarse selection control means comprises a toothed shiftable member operating in unison with the coarse selector switch, and the fine selection control means also comprises a separate toothed member rotatable in unison with said fine selector switch.

3. Apparatus according to claim 1, in which the coarse selection control means comprises a single toothed shaft stopping wheel and said fine selection control means includes a multi-toothed shaft stopping wheel having teeth equal in number to the number of fine incremental settings for said shaft.

4. Apparatus according to claim 1, in which said fine selection control means includes a multi-toothed shaft stopping wheel and a cooperating selectively shiftable stopping pawl.

5. Apparatus according to claim 1, in which said coarse selection control means includes a single-toothed shaft stopping wheel and a cooperating shiftable pawl, and said fine selection control means includes a multi-toothed shaft stopping wheel and a selectively shiftable pawl.

6. Apparatus of the character described for selectively setting a rotatable shaft which is required to undergo either a fractional revolution or more than one complete revolution before arriving at its selected setting, comprising, a first member rotatable with the shaft and having an abutment and a respective individual cooperating shiftable pawl for determining the coarse setting of said shaft, another member rotatable with the shaft and having an abutment and a separate respective cooperating shiftable pawl for determining the fine incremental setting of said shaft, means responsive to the initiation of a selective cycle of the apparatus to withdraw said pawls from engagement with their respective abutments, electro-magnetic means for retaining said pawls in their withdrawn positions, and a pair of selector switches of the seeking type for selectively and respectively controlling said electro-magnetic means to operate said pawls in sequence.

7. Apparatus according to claim 6, in which said electro-magnetic means comprises a pair of relays each having an armature-controlled member associated with a respective one of said pawls for locking it in its withdrawn position.

8. Apparatus according to claim 6, in which said electro-magnetic means comprises a pair of relays each having an armature-controlled member associated with a respective one of said pawls for locking it in its withdrawn position, and electric circuits for controlling said relays said circuits being completed respectively through an associated one of said selector switches.

9. Apparatus according to claim 6, in which said electro-magnetic means comprises, a pair of relays each having an armature-controlled member associated with a respective one of said pawls for locking it in its withdrawn position, a motor for driving said shaft, motor control circuits completed respectively through contacts of said relays, and energizing circuits for said relays each controlled by a respective one of said selector switches.

10. Apparatus according to claim 6, in which means are provided for operating said members and their respective selector switches at different seeking rates.

11. Apparatus of the character described, comprising, a shaft to be selectively rotated to any one of a large number of settings, a motor for driving said shaft, means responsive to the initiation of an operational cycle of said apparatus for first rotating said shaft to a home position and then to a selective position, a coarse selection control mechanism for determining the number of complete revolutions said shaft is to make from its home position, a fine selection control mechanism for determining the incremental fractional revolution said shaft is to make in order to arrive at said setting, each of said selection control mechanisms including a respectively individually selectively shiftable pawl and an associated rotatable stop control member driven from said shaft, and a pair of coarse and fine selector switches of the seeking type for selectively controlling the operation of said pawls in sequence.

12. Apparatus according to claim 11, in which each of said pawls is provided with a latching mechanism for withdrawing it from engagement with its associated stop control member while the shaft is rotating to home position.

13. Apparatus according to claim 11, in which said motor rotates said shaft in one direction to said home position, and means are provided for automatically reversing the direction of the shaft rotation during its selecting movement.

14. Apparatus according to claim 11, in which means are provided and effective only during the beginning of rotation of said shaft to home position to move said pawls out of engagement with their respective stop members, and separate electro-magnetic means are provided for retaining said pawls out of such engagement until they are selectively shifted into engagement under control of said seeking switches.

15. Apparatus according to claim 11, in which a single-turn clutch is provided for withdrawing said pawls initially out of engagement with their respective stopping members, and separate electro-magnetic means are provided for locking said pawls out of such engagement until they are selectively released under control of the associated selector switches.

16. Apparatus according to claim 11, in which means are provided and effective only during the initial movement of said shaft to home position to cock said pawls out of engagement with their respective stop members, electro-magnetic means for locking said pawls in their cocked position until the shaft reaches home position and until they are selectively released under control of their respective seeking switches, and motor control circuits completed by said electro-magnetic means.

17. Apparatus according to claim 11, in which means are provided for causing the coarse selection control mechanism and the fine selection control mechanism to repeat automatically their selecting cycles when either of them fails to operate to stop said shaft in response to the setting of said selector switches.

18. Apparatus according to claim 11, in which the coarse seeking switch has a rotor which is selectively connectable to said shaft to rotate it at a high speed during the coarse selection, and said fine seeking switch has a rotor which is coupled to said shaft to rotate it at a lower speed during the fine selection.

19. Apparatus of the character described for selectively setting a rotatable shaft which is required to undergo successive coarse and fine rotations before arriving at its selected setting, comprising a driving motor for the shaft, coarse selecting mechanism for determining the number of complete revolutions the shaft is to make, fine selecting mechanism for determining the incremental fractional revolution the shaft is to make, a coarse rotary selector switch having a rotor which is rotatable with said shaft, a fine rotary selector switch also having a rotor movable as a unit with said shaft, a shaft-stopping wheel rotatable with the first rotor, another shaft-stopping wheel rotatable with the other rotor, a motor for driving said shaft and said rotors, a selectively shiftable pawl for stopping said first wheel and rotor, another selectively shiftable pawl for stopping said other wheel and other rotor, electro-magnetic means controlled by said first selector switch for causing the first pawl to engage the first wheel, other electro-magnetic means for causing the other pawl to engage the other wheel, a differential gear train operatively related to said wheels for causing the shaft to rotate at a high speed to complete the coarse setting and thereafter causing the shaft to rotate at a lower speed to complete the fine selection, and a torque-limiting clutch between said differential gear train and said shaft for preventing damage to the apparatus when said shaft is stopped by engagement between said other shiftable pawl and said other rotor prior to stopping of the driving motor.

20. Apparatus according to claim 19, in which the rotor for the coarse selector switch is free on said shaft, and a coupling member is pivotally attached to said first-mentioned wheel to selectively lock said first-mentioned wheel to said shaft.

21. Apparatus according to claim 19, in which the rotor of the coarse selector switch is free on said shaft, and a coupling member is pivotally attached to said first-mentioned wheel and effective during the coarse selection to lock said coarse selector switch to said shaft, and means effective in response to the engagement of the first-mentioned shiftable pawl with said first-mentioned wheel to unlock said coarse selector switch from said shaft upon the completion of the coarse selection.

22. Apparatus according to claim 19, in which the first-mentioned rotor is mounted for rotation around said shaft, a shiftable arm for coupling said first-mentioned wheel to said shaft during the coarse selection, and means effective when said coarse selection is completed for operating said arm to decouple said first-mentioned wheel from said shaft.

23. Apparatus of the character described for selectively setting a rotatable shaft which is required to undergo successive coarse and fine selecting rotations before arriving at its selected setting, a first automatic selector switch having a rotor fastened to said shaft, a second automatic selector switch having a rotor arranged to be coupled to said shaft, a coarse selecting wheel for controlling the stopping of the second-mentioned rotor said coarse selecting wheel being provided with a shiftable pawl for stopping it in selected position, means cooperating with said pawl when in said stopping position to decouple the rotor of the second switch from said shaft, a fine selecting wheel for controlling the stopping of the first-mentioned rotor, a selectively shiftable pawl for said fine selector wheel, each of said rotors comprising a series of contact-operating cams and a series of shiftable circuit contacts each operated by a respective one of said cams, a motor for driving said switch rotors and said wheels, a first electric circuit for the motor controlled by the contacts of the first selector switch, and another electric circuit for the motor controlled by the contacts of the second selector switch.

24. Apparatus according to claim 23, in which a fine selection relay is connected in circuit with the contacts of the first selector switch, a coarse selection relay is connected in circuit with the contacts of the second selector switch said first motor circuit being controlled by the contacts of the fine selection relay and the second motor circuit being controlled by the contacts of the coarse selection relay.

25. Apparatus according to claim 23, in which a fine selection relay is provided having its energizing circuit controlled through the contacts of the first selector switch, a coarse selection relay having its energizing circuit controlled through the contacts of the second selector switch, latch means cooperating with the armature of the fine selection relay for latching the second-mentioned pawl out of engagement with the fine selecting wheel and said coarse selection relay having means for latching the first-mentioned pawl out of engagement with the coarse selecting wheel.

26. Apparatus of the character described, comprising, a shaft to be selectively positioned, a coarse selector switch having a circuit-seeking rotor arranged to be driven from said shaft, a fine selector switch having a circuit-seeking rotor also driven from said shaft, a motor for driving both of said rotors and said shaft, a shiftable pawl effective in one position to couple the first-mentioned rotor to said shaft and effective in another position to decouple said first-mentioned rotor from said shaft, means for causing said motor to drive said rotors and said shaft in a homing direction upon the initiation of a selection cycle of the apparatus, means responsive to the beginning of said homing rotation to operate said pawl to couple said second-mentioned rotor to said shaft, latch means for latching said pawl in its operated position, an electromagnetic relay for locking said latch, an energizing circuit for said relay closed upon the initiation of said selection cycle and under control of the coarse selector switch, a toothed stopping wheel for controlling the fine setting of said shaft, a shiftable pawl cooperating with said toothed wheel, means responsive to the initiation of said selection cycle to withdraw the last-mentioned pawl from engagement with said toothed wheel, another electro-magnetic relay for latching the second-mentioned pawl in its withdrawn position the energizing circuit of said other relay being controlled by said fine selector switch, and separate circuit means for maintaining said coarse selection relay energized while said shaft is moving to home position.

27. Apparatus of the character described, comprising, a main shaft to be selectively set, a coarse rotary selector switch, a fine rotary selector switch, a coarse setting control pawl, a fine setting control pawl, a motor for driving said main shaft, a coarse selection control relay, a fine selection control relay, electric circuit means responsive to the initiation of a selective cycle of the apparatus to operate both said relays, separate circuits for the motor closed respectively through the contacts of the coarse relay and the contacts of the fine relay, a trip member effective upon the initiation of said cycle to rock both said pawls to render them ineffective to stop said shaft while allowing said motor to rotate said shaft to a home position, means effective when said home position is reached for automatically reversing the motor direction to cause said shaft to execute first a coarse selection motion and then a fine selection motion, means effective when said coarse selection motion is completed for automatically de-energizing said coarse control relay under control of said coarse selector switch to cause said coarse control pawl to stop further coarse motion of said shaft, and means effective when said shaft has completed its fine selection motion for automatically de-energizing said fine control relay under control of said fine selector switch to cause said fine control pawl to stop further motion of said shaft.

28. Apparatus according to claim 27, in which said separate motor circuits are completed through the contacts of a motor reversing switch said switch having an operating member which is coupled to said shaft through a lost-motion device, said device being arranged to take-up on said switch-operating member when said shaft has reached its home position.

29. Apparatus according to claim 27, in which said separate motor circuits are completed through the contacts of a motor reversing switch, said switch having an operating member which is coupled to said shaft through a lost-motion device, said device operating said reversing switch in one direction when the shaft has reached its home position and operating said reversing switch in the opposite direction if said shaft has not completed its coarse selection motion within a predetermined number of complete revolutions.

30. Apparatus of the character described, comprising, a main shaft to be selectively set, a coarse setting control mechanism for said shaft for determining the number of complete revolutions of the shaft, a fine setting control mechanism for said shaft for determining the incremental shaft revolution in order to arrive at its desired setting, respective coarse and fine selector switches for controlling said mechanisms, a motor for driving said shaft under control of said mechanisms, a motor reversing switch mechanism, a limit device operated when said shaft reaches the limit of rotation in either direction for automatically reversing said switch mechanism and the motor rotation, and an interlock device between said reversing switch mechanism and said course and fine selecting mechanisms for automatically causing said mechanisms to repeat their cycle of operations in the event that they fail to do so on the first attempt.

31. Apparatus of the character described, comprising, a main shaft to be selectively rotated to any one of a large number of settings, a reversible motor for rotating said shaft, a disc normally free to rotate around said shaft and having a stopping abutment on its periphery, a member pivotally attached to said disc and having a portion for locking said disc to said shaft, a spring normally urging said member into locking position, a selectively shiftable pawl effective in one position to unlock said member from said shaft, means responsive to the beginning of an operational cycle of the apparatus for moving said pawl to allow said member to lock said disc to said shaft, an automatic selector switch having a rotor member rotatable with said disc, an electro-magnetic relay latch controlled by said selector switch for controlling said pawl and the circuit of said motor, means effective when said disc and selector switch reach a desired setting for causing said relay to release said pawl and thereby to decouple said disc from said shaft, and a fixed stop cooperating with said member for positively limiting any further rotation of said disc and said switch after they are decoupled from said shaft.

32. Apparatus according to claim 31, in which said shaft also has coupled thereto a multi-toothed wheel and another automatic selector switch, and a differential gear train connected between said motor said disc and said toothed wheel for driving the shaft and the first selector switch at a high rate of speed, and means responsive to the stopping of said disc for causing said differential gear train to rotate said stopping wheel and said other selector switch at a lower rate of speed.

RICHARD W. MAY.
ROSS S. PYLE.

References Cited in the file of this patent
UNITED STATES PATENTS

| Number | Name | Date |
|---|---|---|
| 1,508,796 | Kaminski | Sept. 16, 1924 |
| 1,777,796 | Hubbell | Oct. 7, 1930 |
| 2,034,708 | Browne et al. | Mar. 24, 1936 |
| 2,436,172 | Kent | Feb. 17, 1948 |
| 2,442,739 | Yardeny | June 1, 1948 |
| 2,467,422 | Bruene | Apr. 19, 1949 |
| 2,470,567 | May | May 17, 1949 |
| 2,471,843 | Stamper | May 31, 1949 |
| 2,494,922 | Yardeny | Jan. 17, 1950 |